United States Patent
Shen et al.

(10) Patent No.: US 10,186,815 B2
(45) Date of Patent: Jan. 22, 2019

(54) METHOD OF AND DEVICE FOR PROTECTING USB TYPE-C INTERFACE CHIP WHEN CC PINS THEREOF BEING AT HIGH VOLTAGE

(71) Applicant: International Green Chip (Tianjin) Co., Ltd., Tianjin (CN)

(72) Inventors: Yu Shen, Tianjin (CN); Xiaolong Chen, Tianjin (CN)

(73) Assignee: INTERNATIONAL GREEN CHIP (TIANJIN) CO., LTD., Tianjin (CN)

( * ) Notice: Subject to any disclaimer, the term of this patent is extended or adjusted under 35 U.S.C. 154(b) by 23 days.

(21) Appl. No.: 15/359,897

(22) Filed: Nov. 23, 2016

(65) Prior Publication Data

US 2017/0155214 A1    Jun. 1, 2017

(30) Foreign Application Priority Data

Nov. 26, 2015    (CN) .......................... 2015 1 0844625

(51) Int. Cl.
| | | |
|---|---|---|
| *H02H 3/20* | (2006.01) | |
| *H01R 13/66* | (2006.01) | |
| *H01R 24/60* | (2011.01) | |
| *H01R 13/713* | (2006.01) | |
| *H01R 107/00* | (2006.01) | |
| *H02H 3/02* | (2006.01) | |

(52) U.S. Cl.
CPC ..... *H01R 13/6666* (2013.01); *H01R 13/6683* (2013.01); *H01R 13/713* (2013.01); *H01R 24/60* (2013.01); *H02H 3/20* (2013.01); *H01R 2107/00* (2013.01); *H02H 3/023* (2013.01)

(58) Field of Classification Search
CPC .............. H01R 2107/00; H01R 13/713; H01R 13/6666; H01R 13/6683; H01R 24/60; H02H 3/20; H02H 3/023
See application file for complete search history.

(56) References Cited

U.S. PATENT DOCUMENTS

| | | | | |
|---|---|---|---|---|
| 2007/0025038 A1* | 2/2007 | Biagi | ..................... | G11C 5/005 361/90 |
| 2007/0047164 A1* | 3/2007 | Biagi | ..................... | G11C 5/005 361/78 |

* cited by examiner

*Primary Examiner* — Robert Deberadinis
(74) *Attorney, Agent, or Firm* — Buchanan Ingersoll & Rooney PC (57) ABSTRACT

A USB Type-C interface chip having a CC pin. In an embodiment, the chip includes an internal unit coupled through a signal path to the CC pin; a high voltage detection unit coupled in the signal path, for detecting a voltage at the CC pin and comparing the detected voltage and a reference voltage; a high voltage protection unit for protecting, in response to the comparison result of the high voltage detection unit the internal unit from high voltage possibly present at the port of the chip.

10 Claims, 5 Drawing Sheets

METHOD OF AND DEVICE FOR PROTECTING USB TYPE-C INTERFACE CHIP WHEN CC PINS THEREOF BEING AT HIGH VOLTAGE

BACKGROUND

Technical Field

The present invention relates to the field of USB Type-C chip interface application, and, in particular, to implementation of a circuit structure for protecting a non-high voltage module inside a chip from high voltage.

Related Art

With rapid development of device miniaturization and portable devices, the physical size and the number of data interfaces gradually become key factors for restricting the size of such a device. Therefore, demands for data interface miniaturization become stronger. Under this background, the USB standards organization proposes a new-generation USB Type-C interface standard, to satisfy increasing demands. In addition to reduction in the physical size of the interface, functions of the interface are enriched, such as support for multi-signal path and high voltage VBUS power supply.

Figure 12:
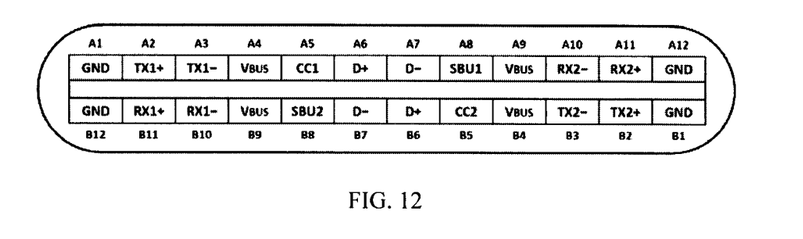
FIG. 12 shows a USB Type-C interface.

In a USB Type-C interface as shown in FIG. 12, CC pins (that is, CC1 and CC2 pins) are closely adjacent to VBUS pins that can transmit a high voltage. Considering such a mechanical structure of the interface, there may be a probability that a CC pin is short-circuited to a VBUS pin in operation. If the VBUS pin is powered by a standard voltage, the short circuit may trigger only functional problems such as USB Type-C interface detection. If the VBUS is in a high voltage state, relevant port-detection chip may be burned.

SUMMARY

The present invention provides in an aspect a USB Type-C interface chip having a CC pin. In an embodiment, the chip comprises an internal unit coupled through a signal path to the CC pin; a high voltage detection unit coupled in the signal path, for detecting a voltage at the CC pin and comparing the detected voltage and a reference voltage; a high voltage protection unit for protecting, in response to the comparison result of the high voltage detection unit the internal unit from high voltage possibly present at the port of the chip.

The high voltage protection unit may be a switch connected in series in the signal path, which blocks a high voltage at the CC pin in response to the comparison of the high voltage detection unit.

The high voltage protection unit may be a switch connected in parallel in the signal path, which short-circuits a high voltage at CC pin in response to the comparison of the high voltage detection unit.

The USB Type-C interface chip may further comprise a charging identification unit for providing an equivalent circuit structure that could be identified by an equipment externally connected to the CC pin when a USB Type-C interface chip is in dead battery condition; and, a logic control unit (103) for performing enabling or disabling the high voltage protection unit and the high voltage detection according to the comparison result.

The present invention provides in another aspect a USB Type-C interface chip having a CC pin, comprising an internal unit coupled through a signal path to the CC pin; a high voltage protection unit having specific characteristics, coupled in the signal path; said specific characteristics enabling the high voltage protection unit to block the internal unit from high voltage possibly present at the CC pin. The high voltage protection unit is preferably a high voltage NMOS transistor, a high voltage PMOS transistor or high voltage transmission gate.

BRIEF DESCRIPTION OF THE DRAWINGS

Preferred embodiments are described with reference to the following accompanying drawings, in which.

DETAILED DESCRIPTION

A USB Type-C interface chip and its devices can provide power to external equipment or be charged by an external power source or equipment. An internal unit of the chip may be configured to be connected to the CC pin(s) of the chip so as to be used for power role setting and detecting. If a device is configured in a switchable power mode or dual role power mode (i.e., switchable between power role of sourcing and power role of sinking) and happens to be in a sourcing mode, identification circuits of internal source mode and external source mode with a high voltage power supply will be connected together via one CC pin of the USB type-C interface, which will lead to high voltage at the CC pin and trigger a high voltage protection since there is no standard source-sink connection exists.

To protect the USB Type-C interface chip and its internal unit from being damaged by a high voltage possibly presented at the CC pin or pins (referred below as port) of the chip, embodiments of the present invention provide a high voltage protection device comprising a detection unit and protection unit. The detection unit may monitor the port and, in response to the detection unit detecting an occurrence of a high voltage at the port, the protection unit will automatically protect relevant non-high-voltage resistant modules inside the chip. The non-high voltage resistant module is a part of sub-modules of internal units of the chip and used for connecting to CC pins so as for the system or device comprising the chip be identified by external charging equipment as a to-be-charged device. If a to-be-charged device exhibits a status of being ready for charging, a resistance to ground will be present at one of the pins of the port.

The high voltage protection unit may be either connected in series in a relevant signal path between the internal units and the CC pins, or alternatively connected in parallel in the signal path.

Figures 1, 2:
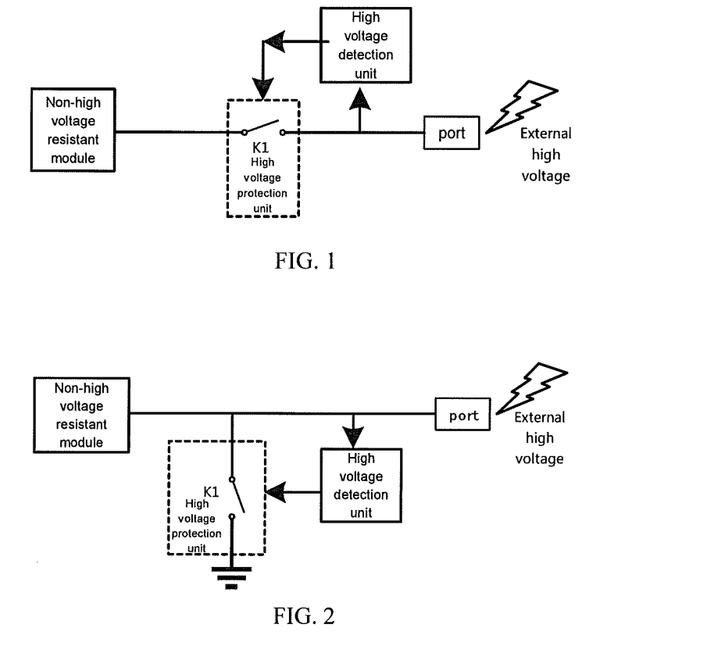
FIG. 1 is a schematic diagram of a high voltage protection device having a high voltage protection unit connected in series in a signal path according to an embodiment of the present invention.
FIG. 2 is a schematic diagram of a high voltage protection device having a high voltage protection unit connected in parallel in a signal path according to an embodiment of the present invention.

FIG. 1 is a schematic diagram of a high voltage protection device having a high voltage protection unit connected in series in a signal path according to an embodiment of the present invention. As shown in FIG. 1, the high voltage protection device has a high voltage protection unit and a high voltage detection unit. In an example, the high voltage protection unit is a switch K1 that receives a control signal from the high voltage detection unit and is connected in series in a signal path between the port and a Non-high voltage resistant module inside the chip. The high voltage detection unit determines a state of an input voltage at a port of a chip. If a detection result is that the port of the chip is in a high voltage, the high voltage detection unit outputs to control the switch K1 to be opened to block the high voltage at the port of the chip. If the voltage at the port of the chip is normal, the high voltage detection unit outputs to control the switch K1 to be closed to transfer a signal between the port of the chip and the non-high voltage resistant module.

FIG. 2 is a schematic diagram of a high voltage protection device having a high voltage protection unit connected in parallel in a signal path according to an embodiment of the present invention. The device of FIG. 2 differs from FIG. 1 in that, the high voltage protection unit (for example a switch K1) is connected in parallel in a signal path. If the high voltage detection unit detects that the port of the chip is in a high voltage state, the high voltage detection unit will output to control the switch K1 to be closed to compulsively short-circuit the high voltage at the port of the chip to the ground. If the voltage at the port of the chip is normal, the high voltage detection unit will output to control the switch K1 to be opened so as not to negatively affect transfer of a signal between the port of the chip and a non-high voltage resistant module.

Figure 3:
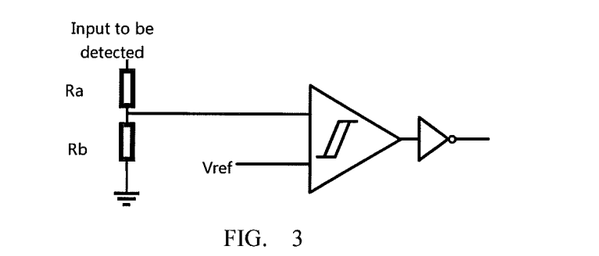
FIG. 3 shows a high voltage detection unit in the high voltage protection device as shown in FIG. 1 or 2.

FIG. 3 shows a high voltage detection unit in the high voltage protection device as shown in FIG. 1 or 2. As shown in FIG. 3, a voltage is input to one input terminal of a comparator, for example via a voltage divider. The voltage divider may be constituted by resistors R1 and R2 and assists in decreasing in proportion the voltage in the input terminal to an acceptable and safe range. The comparator has another input terminal receiving a reference voltage. When the voltage is higher than the reference, the comparator will output a logically high signal, otherwise a logically low signal. A control signal chosen from the output of the comparator, based on the connection status of the switch K1, will be sent to control the switch K1.

In this embodiment, the reference voltage VREF can be generated by voltage divider formed by resistors, a band-gap reference circuit, or a MOS transistor or can be provided from outside of the chip.

Please note that the comparator may be any kind of device fulfilling comparison, including hysteresis comparator.

The present invention may have another implementation of a high voltage protection unit having specific characteristics without any high voltage detection unit. The specific characteristics functions as a de facto automatic high voltage detection and protection, i.e., block the high voltage from internal unit. The high voltage protection unit may be a high voltage NMOS transistor, a high voltage PMOS transistor or high voltage transmission gate. An example of the high voltage protection unit is a high voltage NMOS transistor connected in series in the signal path so as to block the internal units from a high voltage at the port of the chip.

Figure 4:
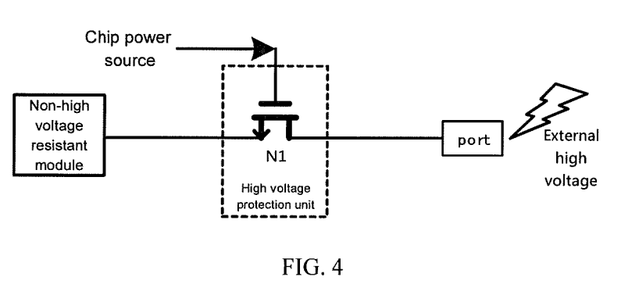
FIG. 4 is a schematic diagram of a high voltage protection device without a high voltage detection unit according to an embodiment of the present invention.

FIG. 4 is a schematic diagram of a high voltage protection device without a high voltage detection unit according to an embodiment of the present invention. As shown in FIG. 4, no high voltage detection unit is included. A high voltage NMOS transistor N1 is connected in series in a signal path, which may be turned on by power supplied by a power source of the chip. If a port of the chip is in a high voltage state, N1 can maintain the voltage provided to a joint of a non-high voltage resistant module inside the chip not higher than a power source voltage of the chip due to device characteristics of the N1. If the voltage at the port of the chip is normal, N1 is normally turned on to transfer a signal between the port of the chip and the non-high voltage resistant module.

Further to blocking the internal unit from the high voltage, the high voltage protection device may re-use such a dedicated charging identification unit, which presents, via logic control function and corresponding detection steps, an equivalent circuit structure that can be charging-identified when the power supply of USB type-C interface chip is at zero voltage, i.e., dead battery condition. The equivalent circuit structure may lead to a range of voltage allowable according to USB type-C specification, which will allow charging identification and thus safe charging when a charging port is configured by means of an external high voltage power source and resistors.

Figure 5:
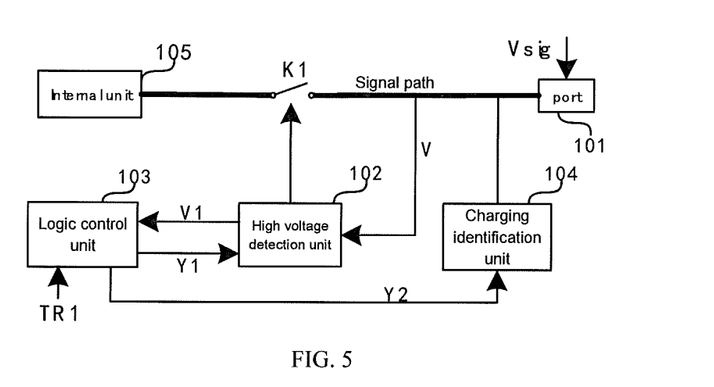
FIG. 5 is a schematic structural diagram of a high voltage protection device having a charging identification circuit according to an embodiment of the present invention.

FIG. 5 is a schematic structural diagram of a high voltage protection device having a charging identification circuit according to an embodiment of the present invention. As shown in FIG. 5, the high voltage protection device (the term here referred also as dead battery support block) differs from FIG. 1 by further comprising a high voltage detection unit 102, a charging identification unit 104, and a logic control unit 103.

The port 101 receives a to-be-detected signal Vsig and is connected to the internal unit 105 by means of the first switch K1, to form a signal path. The internal unit 105 is configured to present a first equivalent resistor at the port 101 so that the chip can be identified by sourcing side. The high voltage detection unit 102 detects an input voltage V of the to-be-detected signal Vsig, compares a voltage divided from the input voltage V and a reference voltage VREF to generate a comparison result V1, and generates a first switch signal F1 having different values determined according to the comparison result V1. The logic control unit 103 performs enabling or disabling either of the high voltage detection unit 102 and the charging identification unit 104 or both according to the comparison result V1. The charging identification unit 104 thus will present a second equivalent resistor or a third equivalent resistor at the port 101 depending on the to-be-detected signal Vsig so that the chip can be identified by sourcing side. When the chip is powered on normally, control signal Y1 will keep high voltage detection unit 102 active and control signal Y2 will turn off the charging identification 104 to avoid the extra resistance negatively affecting the detection. Additionally, control signals Y1 and/or Y2 may be provided according to chip control system requirements to enable or disable the detection unit 102 and/or identification unit 104, which will be discussed later on.

It should be noted that in this embodiment, the logic control unit 103 is capable of receiving a control signal TR1 generated by the system of USB Type-C interface chip and generating a first enabling signal Y1 and a second enabling signal Y2 according to the control signal TR1 alone or jointly with the comparison result V1, where the first enabling signal Y1 is used for enabling and disabling of the high voltage detection unit 102, and the second enabling signal Y2 is used for enabling and disabling of the charging identification unit 104.

Figure 6:
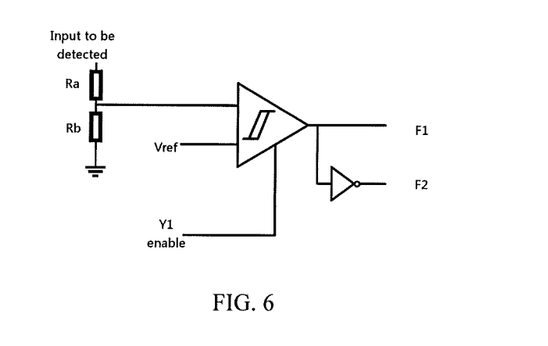
FIG. 6 shows a high voltage detection unit in the high voltage protection device as shown in FIG. 5.

FIG. 6 shows a high voltage detection unit in the high voltage protection device as shown in FIG. 5. The high voltage detection unit differs from the unit as shown in FIG. 3 in that the comparator can be enabled or disabled based on a Y1 enable signal.

Figure 7:
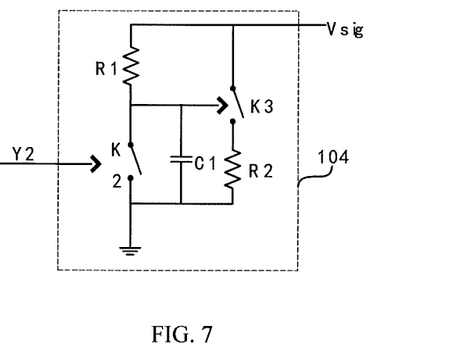
FIG. 7 is a schematic structural diagram of a charging identification unit for the dead battery support block shown in FIG. 5.

FIG. 7 is a schematic structural diagram of a charging identification unit for the dead battery support block shown in FIG. 5. As shown in FIG. 7, the charging identification unit 104 includes: a first resistor R1, a second resistor R2, a first capacitor C1, a second switch K2, and a third switch K3. The first resistor R1 may have a megaohm-level resistance, for example 1 MΩ, and is connected in series to the second switch K2 and then together is connected between the port 101 and the ground; the second resistor R2 may have a kiloohm-level resistance, for example 1 KΩ, and together is connected in series to the third switch K3 and then is connected between the port 101 and the ground; the third switch K3 has a control terminal controlled by a node between the resistor R1 and switch K2. The first capacitor C1 is connected between the control terminal of the switch K3 and the ground, and may have a relatively great capacitance, for example 1 pF, so as to stabilize a working voltage of the charging identification unit 104.

Switch K2 may be switched on in response to an active signal Y2. In case that K2 is switched off in response to an inactive signal Y2, and a high voltage Vsig is at the port (when the port is at a regular in dead battery condition and is externally connected at the port to a charging/sourcing role equipment), R1 will pass the voltage from the charging equipment to switch K3 and form a new path between the port and the ground.

It should be noted that, in this embodiment, the first switch K1, the second switch K2, or the third switch K3 may be implemented by a CMOS transfer gate or a MOS transistor.

Specifically, a working principle of the high voltage protection device with the help of charging identification unit 104 will be discussed with respect to FIG. 5-7 in detail.

When the high voltage protection device is powered, the high voltage detection unit 102 senses an input voltage V of the to-be-detected signal Vsig, compares a voltage divided from the input voltage V and a reference voltage VREF to generate a comparison result V1, and outputs the comparison result V1 to the logic control unit 103.

If the comparison result V1 is that the divided input voltage V is less than or equal to the reference voltage VREF, the high voltage detection unit 102 generates and outputs a first switch signal F1 having a first value (for example, 1) to the first switch K1. The first switch K1 is closed according to the first switch signal F1 to conduct the signal path. The high voltage protected device (mainly the internal unit 105) thus presents a first equivalent resistor at the port 101. The first equivalent resistor has a resistance of, for an example, 5.1 KΩ. It indicates that the high voltage protected device should be powered and the divided input voltage V of the to-be-detected signal Vsig to which the port 101 is connected is less than or equal to the reference voltage VREF. In this case, the charging identification unit 104 is signaled via Y2 by the logic control unit 103 not to work (switching on the K2 so as to present R1 to the port).

If the comparison result V1 demonstrates that the divided input voltage V is greater than the reference voltage VREF (the to-be-detected signal Vsig is at a high voltage), the high voltage detection unit 102 generates and outputs the first switch signal F1 having a second value (for example, 0) to the first switch K1. The first switch K1 is opened according to the switch signal F1, to turnoff the signal path. The logic control unit 103 signals via Y2 the charging identification unit 104 to present a second equivalent resistor at the port 101. Specifically, the first resistor R1 is the second equivalent resistor, which for example has a resistance of 1 MΩ.

When the chip is in dead battery condition, the internal unit 105, the high voltage detection unit 102, and the logic control unit 103 do not work because no power is supplied; the first switch K1 is opened to turn off the signal path without power supply. The charging identification unit 104 works in response to the signal Vsig so as to present a third equivalent resistor at the port 101, which indicates that the system contains the USB Type-C interface chip needing to be sourced. Specifically, the third switch K3 is closed under the action of to-be-detected signal Vsig, and the second switch K2 keeps open when it is not powered. A sum of a resistor of the third switch K3 and the second resistor R2 constitutes the third equivalent resistor, which for example has an equivalent resistance of for example 5.1 kΩ.

It should also be noted that in this embodiment, when the USB Type-C interface chip normally works, for example the system supplies normally and no false triggering of high voltage protection has to be testified, the charging identification unit 104 is disconnected from the port 101 via TR1 signal under control of the system of USB Type-C interface chip, ensuring normal communication of the USB Type-C interface chip.

In actual operations, there may have different sources for the to-be-detected signal Vsig, and there may be different port configurations in order to perform regular power role identification. The port configurations include alternatively a current source I1 provided by a charging equipment, or a voltage source via a resistor and a voltage source.

Figure 8:
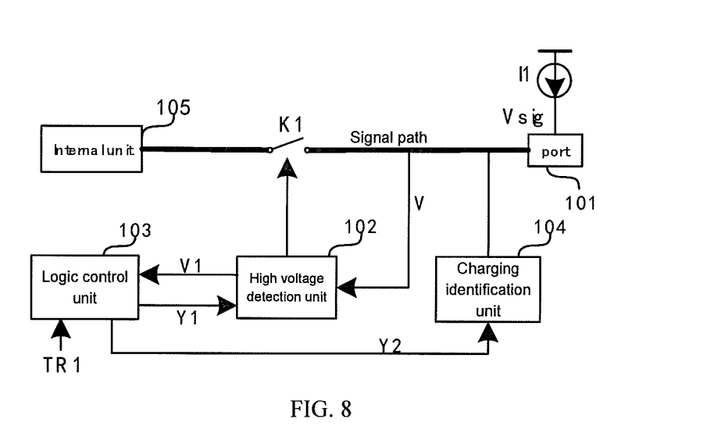
FIG. 8 is a schematic structural diagram of a port configuration circuit.

FIG. 8 is a schematic structural diagram of a port configuration circuit. As shown in FIG. 8, the port of the chip is externally connected to a current source I1 provided by a charging equipment.

When the chip or the high voltage protection device is not powered on, the switch K1 will be maintained at the status of OFF, which will protect the internal unit; and the charging identification unit will present a corresponding equivalent resistance for detection by the other externally connected equipment.

When the chip or the high-voltage-protection device is powered on regularly, the internal unit may be configured, in response to the signal Vsig at the CC pin of the USB type-C interface and based on system status of the chip, as being pulled-down via a particular resister or being connected to a current source output of the chip power supply. If the chip port is externally connected to the current source I1 as provided by the other equipment and the internal unit is just switched as being connected to the current source output of the chip source, respective output terminals of both external and internal current sources of the chip will be coupled together. At this time, if the external power source for the current source I1 has a voltage within the threshold of the high voltage detection unit, no over-voltage-protection will be triggered. However, if the external power source has a voltage high enough, the voltage on the signal path will be higher than the threshold allowed by the high-voltage-detection unit, which will guide the chip into high-voltage protection. In this case, the CC pin will be detached from the external equipment and the internal unit could not detect the status of the external equipment, thus failing to respond to the external equipment.

In order to avoid the failure mentioned above, a control system (not shown) of the chip monitors the chip. When the control system detects the chip entering into high-voltage protection, the control system will temporarily enforce the charge-identification unit to confirm real status of the equipment externally connected to the chip port. That is, the charging identification unit presents an equivalent resistance from the port to the ground, which constitutes a voltage divider to the current source I1. The equivalent resistance simulates the current source I1 being connected via a particular resistor of the internal unit of the chip to the ground. If the voltage of the chip terminal then goes down to be within the threshold allowed by the high-voltage detection unit, the previous high voltage protection status will be treated as a false triggering. Then, the control system of the chip will configure the internal unit as a structure of a particular resistor being pulled down to ground, shut down the high voltage detection unit so as to disable blocking of the protection unit (for example turn on the switch K1), and shut down the charge identification unit so as for the chip to return back to a regular work status. The high voltage detection unit will then be turned on again for detection of the high voltage protection, a correct recognition of external configuration connected to the chip port and a real time and continuous high voltage protection.

From a perspective view of the external charging equipment, if the charging equipment detects that a resistance of the circuit equivalent resistor is within a range allowed by USB Type-C Specification, the to-be-charged device is charged. Specifically, if a resistance of the equivalent resistor of the high voltage protection device is within the range allowed by USB Type-C Specification, it indicates that the resistor presented at the port 101 by the high voltage protection device is the first equivalent resistor or the third equivalent resistor.

Figure 9:
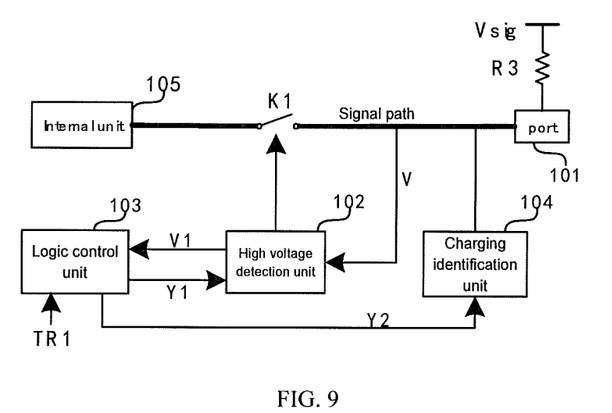
FIG. 9 is a schematic structural diagram of another port configuration circuit.

FIG. 9 is a schematic structural diagram of another port configuration circuit. The high voltage protection device as shown in FIG. 9 differs from the high voltage protection device of FIG. 8 in that the port 101 is connected to a voltage source by means of the third resistor R3 provided by the charging device (the to-be-detected signal Vsig is a voltage source in serial with a resistor). The high voltage protection device will operate roughly the same as the device as shown in FIG. 6 and discussions thereof will be omitted herewith.

From the perspective view of the charging equipment, things are the same. If the charging equipment detects that the resistance the high voltage protection device presented at the port is within a range between for example 4 KΩ and 6 KΩ or within the range allowed by USB Type-C Specification, the to-be-charged device can be charged.

In remaining cases, the to-be-charged device will not be charged.

Figure 10:
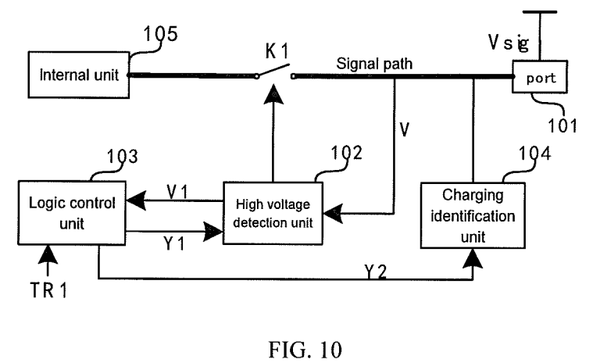
FIG. 10 is a schematic structural diagram of still another port configuration circuit.

FIG. 10 is a schematic structural diagram of still another port configuration circuit. Differing from FIG. 8 and FIG. 9, in the port configuration circuit of FIG. 10, the port 101 is externally connected to a voltage source (the to-be-detected signal Vsig is a voltage source). The high voltage protection device will operate roughly the same as the one as shown in FIG. 6 and FIG. 7, and discussions thereof will be omitted herewith.

From the perspective view of the charging equipment externally connected to the port, if it is detected that a resistance of a resistor of the circuit is within a range allowed by USB Type-C Specification, it indicates that the resistance presented at the port 101 is the first equivalent resistor or the third equivalent resistor. In other words, the high voltage protection device should be powered, and the divided input voltage V of the to-be-detected signal Vsig is less than the reference voltage VREF, or the high voltage protection device is not enabled. Thus, the to-be-charged device can be charged.

Although the above discussion of port configuration circuit is made with respect to a series connection of K1 in the signal path, it may be noted that this applies also to the parallel connection of K1 in the signal path and other kind of high voltage protection unit and corresponding connections.

Figure 11:
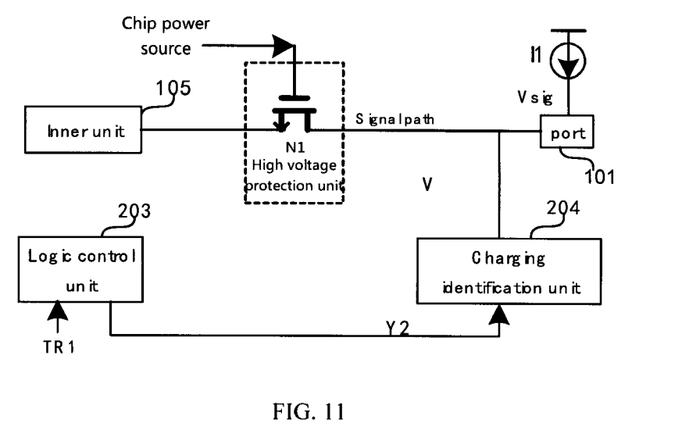
FIG. 11 is a schematic structural diagram of a high voltage protection device according to another embodiment of the present invention.

FIG. 11 is a schematic structural diagram of a high voltage protection device according to another embodiment of the present invention. Differing from FIG. 5, the high voltage detection unit is integrated into the high voltage protection unit because of particular characteristic of the protection unit. An implementation manner of the high voltage protection unit is a high voltage NMOS transistor N1. As shown in FIG. 11, an automatic protection of the internal unit will be enabled without a specific high voltage detection unit, and thus false triggering is prevented. In this case, the logic control unit is used for responding only to an external TR1 signal.

For further detailed discussion of functions of the units included in this embodiment, please refer to FIGS. 3 and 5 and their relevant discussion. For example, logic control unit 203 functions roughly the same as the logic control unit 103 and charging identification unit 204 roughly the same as the charging identification unit 104. In the following, operation of the high voltage protection device will be discussed.

When the chip or the high voltage protection device is not powered on, the N1 on the signal path will be maintained at the status of OFF, which will automatically protect the internal unit. If in this case the port of the high voltage protection device is externally connected to a current source I1 provided by external charging equipment, the charging identification unit will exhibit a corresponding equivalent resistance for detection by the charging equipment.

When the high voltage protection device is powered on regularly, the internal unit may be configured, according to the detection of the CC pin of the USB type-C interface and based on system status of the chip, as either being pulled-down via a particular resistance or being connected to current source output of the chip power supply. If the voltage of the external power source for the current source I1 is within safe voltage range, the internal unit will not be affected negatively. If the external power source has a voltage high enough, N1 will act as protection of the internal unit due to its own characteristics, and the internal unit will work as scheduled and not badly affected.

When the external connected current source I1 has a power voltage high enough and the internal unit is just switched to be connected to a current source output as provided by the chip power supply, the chip will, under the protection of N1, treat the external connection as disconnected and will not respond. The internal unit will not be damaged.

When the external connected current source I1 has a power voltage although high enough and the internal unit is configured to be pulled down to ground via a particular resistance, a voltage within a safe range still can be generated across the particular resistance, for power role detection of the chip to external terminal. No regular detection is affected negatively.

The embodiment in this embodiment is only an implementation manner of the technical solution of the present invention. The quantity and size of relevant elements in the circuit are not uniquely selected and can be designed according to specific actual situations of the USB Type-C interface chip. Any content is regarded as an implementation manner of the present invention as long as not going against the design idea of the technical solution of the present invention.

The foregoing specific implementation manners further describe the objective, technical solution, and beneficial effects of the present invention in detail. It should be understood that the foregoing content is only specific implementation manners of the present invention and is not used to define the protection scope of the present invention. Any modification, equivalent replacement, improvement, and the like made within the spirit and principle of the present invention should all be included in the protection scope of the present invention.

What is claimed is:

1. A USB Type-C interface chip having a CC pin, comprising:
    an internal unit coupled through a signal path to the CC pin;
    a high voltage detection unit coupled in the signal path, for detecting a voltage at the CC pin and comparing the detected voltage and a reference voltage;
    a high voltage protection unit for protecting, in response to the comparison result of the high voltage detection unit, the internal unit from high voltage possibly present at the CC pin;
    a charging identification unit for providing an equivalent circuit structure that can be identified by a charging equipment externally connected to the CC pin when a USB Type-C interface chip is in dead battery condition; and
    a logic control unit for performing enabling or disabling of the high voltage protection unit and the high voltage detection unit according to the comparison result.

2. The USB Type-C interface chip as claimed in claim 1, wherein the high voltage protection unit is a switch connected in series in the signal path, which blocks a high voltage at the CC pin in response to the comparison of the high voltage detection unit.

3. The USB Type-C interface chip as claimed in claim 1, wherein the high voltage protection unit is a switch connected in parallel in the signal path, which short-circuits a high voltage at CC pin in response to the comparison of the high voltage detection unit.

4. The USB Type-C interface chip as claimed in claim 1, wherein the internal unit can provide a first equivalent resistor; the charging identification unit can provide a second equivalent resistor or a third equivalent resistor; and the logic control unit performs, in response to the voltage at the CC pin and configuration of the internal unit to represent one of the first, second and third equivalent resistors at the CC pin for external equipment to identify sourcing mode or sinking mode of the chip.

5. The USB Type-C interface chip as claimed in claim 1, wherein the charging identification unit comprises: a first resistor, a second resistor, a first capacitor, a second switch, and a third switch, wherein
    the first resistor is connected in series to the second switch and then is connected between the CC pin and the ground, the third switch is connected in series to the second resistor and then is connected between the CC pin and the ground, the first capacitor is in parallel connection with the second switch; and the control terminal of the third switch is connected to a joint between the first resistor and the second switch.

6. The USB Type-C interface chip as claimed in claim 1, wherein the logic control unit is capable of receiving a control signal generated by a system of USB Type-C interface chip and generating a first enabling signal and a second enabling signal according to the control signal and the comparison result, wherein the first enabling signal is used for controlling enabling and disabling of the high voltage detection unit, and the second enabling signal is used for controlling enabling and disabling of the charging identification unit.

7. The USB Type-C interface chip as claimed in claim 1, wherein when the chip is detected to enter into high-voltage protection, the charge-identification unit will be temporarily enforced to confirm real status of the equipment externally connected to the chip port; if the voltage of the chip terminal then goes down to be within a threshold allowed by the high-voltage detection unit, the internal unit will be configured as a structure of a particular resistor being pulled down to ground; and the high voltage detection unit is shut down to disable blocking of the protection unit, and the charge identification unit is shut down for the chip to return back to a regular work status.

8. A USB Type-C interface chip having a CC pin, comprising:
    an internal unit coupled through a signal path to the CC pin;
    a high voltage protection unit having specific characteristics, coupled in the signal path, said specific characteristics enabling the high voltage protection unit to block the internal unit from high voltage possibly present at the CC pin;
    a charging identification unit for providing an equivalent circuit structure that can be identified by a charging equipment externally connected to the CC pin when the USB Type-C interface chip is in dead battery condition; and
    a logic control unit for performing enabling or disabling of the high voltage protection unit according to a comparison result.

9. The USB Type-C interface chip as claimed in claim 8, wherein the high voltage protection unit is a high voltage NMOS transistor, a high voltage PMOS transistor or high voltage transmission gate.

10. The USB Type-C interface chip as claimed in claim 8, wherein the charging identification unit comprises: a first resistor, a second resistor, a first capacitor, a second switch, and a third switch, wherein
    the first resistor is connected in series to the second switch and then is connected between the CC pin and the ground, the third switch is connected in series to the second resistor and then is connected between the CC pin and the ground, the first capacitor is in parallel connection with the second switch; and the control terminal of the third switch is connected to the joint between the first resistor and the second switch.

\* \* \* \* \*